United States Patent [19]

Sander et al.

[11] Patent Number: 4,711,208
[45] Date of Patent: Dec. 8, 1987

[54] PISTON FOR INTERNAL COMBUSTION ENGINES

[75] Inventors: Wilfried Sander; Siegfried Mielke, both of Neckarsulm, Fed. Rep. of Germany

[73] Assignee: Kolbenschmidt AG, Neckarsulm, Fed. Rep. of Germany

[21] Appl. No.: 851,881

[22] Filed: Apr. 11, 1986

Related U.S. Application Data

[63] Continuation of Ser. No. 641,532, Aug. 16, 1984, abandoned.

[30] Foreign Application Priority Data

Aug. 24, 1983 [DE] Fed. Rep. of Germany ....... 3330554

[51] Int. Cl.4 ............................................. F02B 19/00
[52] U.S. Cl. .................................. 123/271; 123/279; 123/669
[58] Field of Search ............... 123/193 R, 193 P, 668, 123/669, 270, 271, 276, 279

[56] References Cited

U.S. PATENT DOCUMENTS 3,911,891 10/1975 Dowell ............................... 123/669
4,245,611 1/1981 Mitchell et al. ..................... 123/669

FOREIGN PATENT DOCUMENTS 36413 3/1979 Japan ................................... 123/270
151715 11/1979 Japan ................................... 123/270
2061383 5/1981 United Kingdom ................. 123/668

Primary Examiner—Craig R. Feinberg
Attorney, Agent, or Firm—Sprung Horn Kramer & Woods

[57] ABSTRACT

In a piston for internal combustion engines the piston head is formed with a combustion chamber recess and is provided with a heat-insulating layer of ceramic material. To minimize the heat to be dissipated to the coolant, one part of the heat-insulating layer consists of a solid ceramic insert and the other part consists of a ceramic coating.

13 Claims, 3 Drawing Figures

PISTON FOR INTERNAL COMBUSTION ENGINES

This application is a continuation of application Ser. No. 641,532, filed 8/16/84 now abandoned.

BACKGROUND OF THE INVENTION

This invention relates to a piston for internal combustion engines, particularly for supercharged diesel engines, comprising a piston head, which is formed with a combustion chamber recess provided with a heat-insulating layer of ceramic material having a low heat conductivity.

In internal combustion engines, particularly in diesel engines, the requirements for a lower fuel consumption and lower pollutant emission rates have resulted in an increase of the brake mean effective pressure performance (torque). That increase is achieved in many cases by the use of an exhaust gas turbocharger. The high engine output per unit of displacement results in such a high heat load on the piston that a more effective cooling of the piston is required from the aspects of strength and function. This is inconsistent with the fact that the dissipation of heat from the combustion process to the coolant and to the lubricating oil should be reduced, for the following reasons:

The quantity of lubricating oil, the quantity of coolant and the size of the radiator can be reduced. Less power is required for driving the fan.

The fuel consumption can be reduced if a higher exhaust gas temperature is utilized with the turbocharged system.

The quality of the exhaust gas can be improved, particularly when the engine is warming up, by an improved vaporization of the fuel which is distributed over the top surface of the piston head.

But the desired limitation or decrease of the heat to be dissipated by the coolant involves a high heat load on the piston head so that the latter must be heat-insulated.

Various proposals for the design of heat-insulated piston heads have already been made. J. H. Stang has investigated and has described in "Designing Adiabatic Engine Components", SEA 780,069 an aluminum piston provided with a screwed-on ceramic head, which is insulated from the base by steel discs. Temperatures up to about 900° C. may be attained on the surface of the head of such piston. The problems involved in that "hot" piston reside in that a ceramic top which meets the strength requirements can be manufactured only at high costs and that the dead space above the first piston ring is relatively large.

In another aluminum piston, which is formed in its head with a combustion chamber recess, protected against the heat load by a ring which is embedded in the head casting at the rim of that recess and consists of a ceramic material having a low heat conductivity ($\lambda = 2$ W/mK), a low coefficient of linear expansion ($\alpha = 1.5 \times 10^{-6}$/K) and a low modulus of elasticity ($E = 2 \times 10^4 $N/mm$^2$). That ring has an excellent compressive strength and consists of aluminum titanate ($Al_2TiO_5$) and has a very high resistance to cyclic temperature changes.

The contraction of the aluminum material as it solidifies after the casting operation results in a shrunk joint between the ring and the surrounding aluminum material. The resulting compressive stresses ensure that the ring will be firmly held in position and give rise to compressive stresses in the ring itself. But such ceramic inserts can be provided only in such regions of the piston head in which the inserts are backed on a sufficiently large surface by the surrounding piston material.

From Laid-open German application No. 31 37 731 it is also known to provide the heads of pistons of internal combustion engines with a heat-insulating multilayer coating that is formed by a plurality of alternating layers applied by flame spraying and plasma spraying. Said layers consist of zirconium dioxide and/or zirconium silicate, metal and cerment and the outer layer consists of zirconium dioxide and/or zirconium silicate. Such sprayed-on layers must have a thickness of 1 to 2.5 mm if they are to have an adequate heat insulation value, and they will not adhere to the piston head unless the spray jet is directed as nearly as possible at right angles to the piston head surface which is to be coated and said surface has no substantial depressions or projections. These requirements are adequately met only in that region of the piston heat which is spaced around the combustion recess and at the top land whereas they are not reliably met in the combustion chamber recess and at the rim thereof.

SUMMARY OF THE INVENTION

It is an object of the invention to provide a piston which is of the kind described first hereinbefore with a heat-insulated piston head which, in spite of the difficulties outlined hereinbefore, will exert on the heat balance of the internal combustion engine an influence to the desired extent in that much less heat is to be dissipated by the coolant than in an engine having a piston provided with a piston heat that is not heat-insulated, and specifically said required heat dissipation is reduced to one half or less of the heat dissipation in the latter engine. Besides, the piston should meet all requirements regarding life and economy.

This object is accomplished in according with the invention in that one part of the heat-insulating layer consists of a solid ceramic insert, which is non-positively by a shrinkage fit and/or positively by form locking held in position, and the other part consists of a ceramic coating, which firmly adheres to the piston material of the piston head.

The ceramic insert is provided adjacent to the combustion recess and the ceramic coating is provided in that region of the piston head which is spaced around the combustion chamber recess.

In pistons having a relatively large wall thickness between the bottom of the combustion chamber recess and the inside surface of the piston head, the entire combustion chamber recess is preferably defined by a ceramic insert.

In another embodiment of the heat-insulating layer of a piston having a small wall thickness between the bottom of the combustion chamber recess and the inside surface of the piston head is so designed that the ceramic insert is provided adjacent to the edge between the combustion chamber recess and the top surface of the piston head whereas the inside surface of the combustion chamber recess and that region of the piston head which is spaced around the combustion chamber recess are provided with a ceramic coating.

The ceramic coating on the piston head extends suitably almost as far as to the edge between the top surface of the piston head and the top land and, if desired, the side face of the ceramic coating may be protected by an annular projection provided in a corresponding height at said edge on the side thereof which faces the top surface of the piston head. In that case a wear of the edge of the ceramic coating by mechanical influences will be avoided.

For a further thermal relief, particularly in the region of the first piston ring groove, it may be desired to extend the ceramic coating beyond the preferably rounded edge between the top surface of the piston head and the top land and almost as far as to the edge between the top land and the first piston ring groove.

In a preferred embodiment of the invention, the insert has a wall thickness of 3 to 10 mm preferably 3 to 6 mm and is embedded in the cast piston head or is an interference shrinkage fit in a correspondingly shaped recess and the ceramic coating applied by spraying at high temperature has a thickness of 0.6 to 4 mm, preferably 0.6 to 2 mm.

If the ceramic insert is connected to a piston consisting of a light alloy, said ceramic insert will consist of a ceramic material having a small thermal conductivity, preferably below 10 W/mK, a small coefficient of linear expansion, preferably below $10 \times 10^6$/K, and a low modulus of elasticity, preferably below $7 \times 10^4$ N/mm$^2$. Said requirements will be particularly met by ceramic inserts of aluminum titanate.

In a piston consisting of a ferrous material, the ceramic insert may consist of a ceramic material having a low thermal conductivity and having a coefficient of linear expansion which equals that of the ferrous material employed.

The ceramic coating consists preferably of partly stabilized or fully stabilized zironium oxide.

The ceramic coating may also consist of chromium oxide, which after its application is burnt at temperatures of about 500° C.

BRIEF DESCRIPTION OF THE DRAWINGS

The drawings are longitudinal sectional views taken on a plane that extends at right angles to the axis of a piston designed in accordance with the invention.

DETAILED DESCRIPTION OF THE INVENTION

Figure 1:
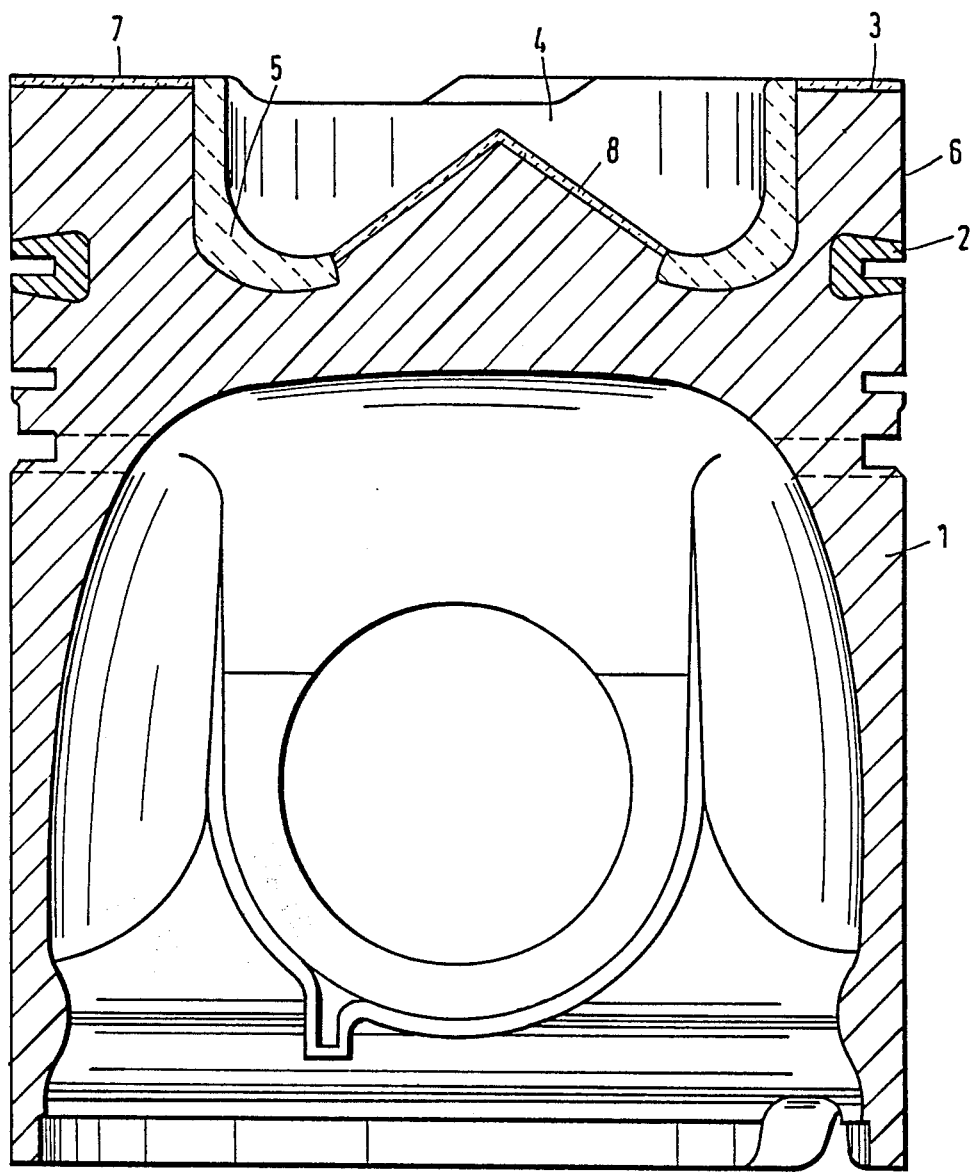

The piston 1 of FIG. 1 consists of a casting of an aluminum alloy of the group AlSi12CuNiMg and comprises a ring carrier 2 and a piston head 3 formed with an open combustion chamber recess 4. The region of the edge between the top surface of the piston head 3 and the combustion chamber recess 4 and the side wall of the combustion chamber recess 4 consists of a solid ceramic insert 5 of aluminum titanate in a thickness of 5 mm. The bottom of the combustion chamber recess 4 and that region of the piston head 3 which ist spaced around the combustion chamber recess 4 are covered by a ceramic coating 7, 8, which has a thickness of 2 mm and consists of fully stabilized zirconium oxide and extends as far as to the edge between the top surface of the piston head 3 and the top land 6.

Figure 2:
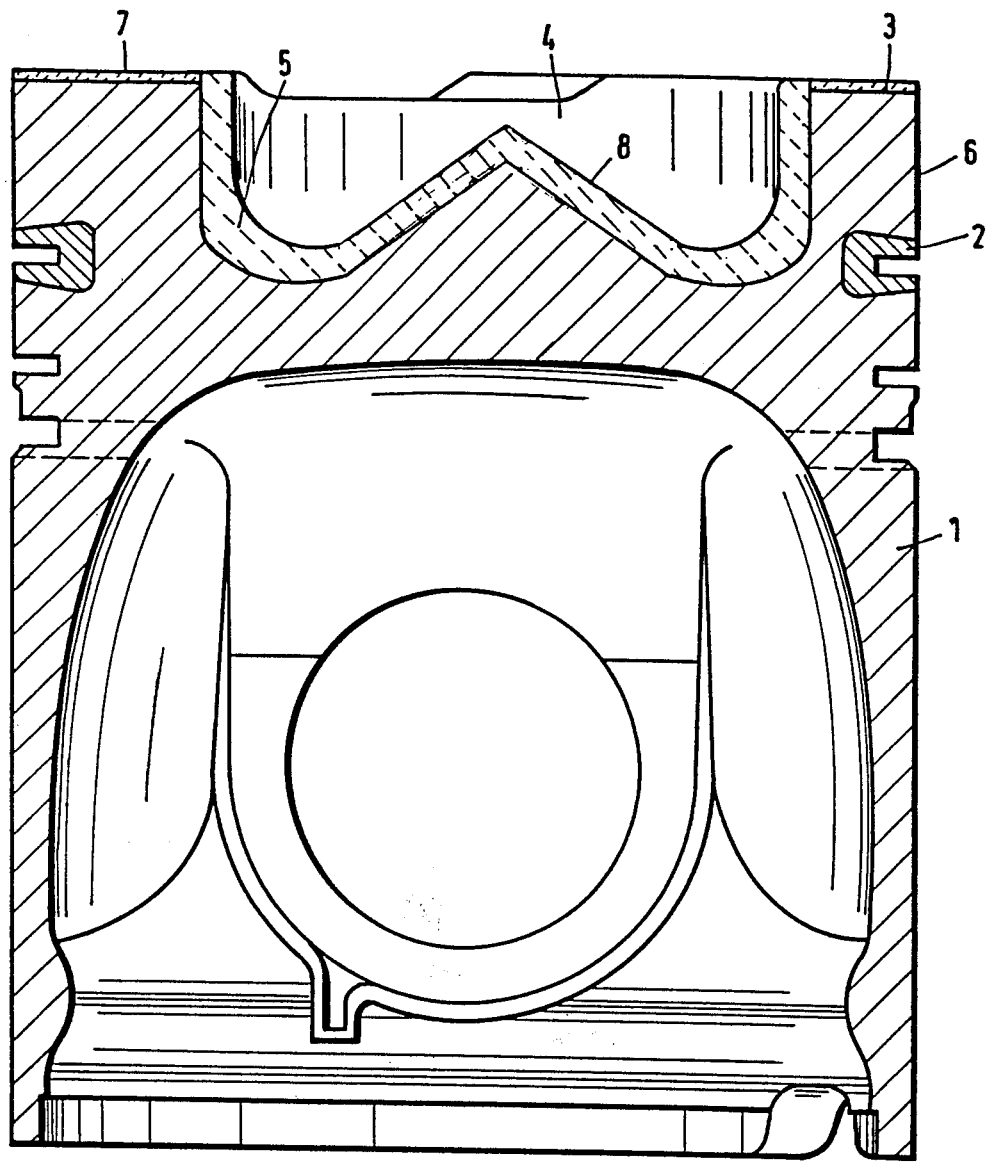

FIG. 2 shows the piston 1 wherein the entire combustion chamber recess 4 is defined by the ceramic insert 5.

Figure 3:
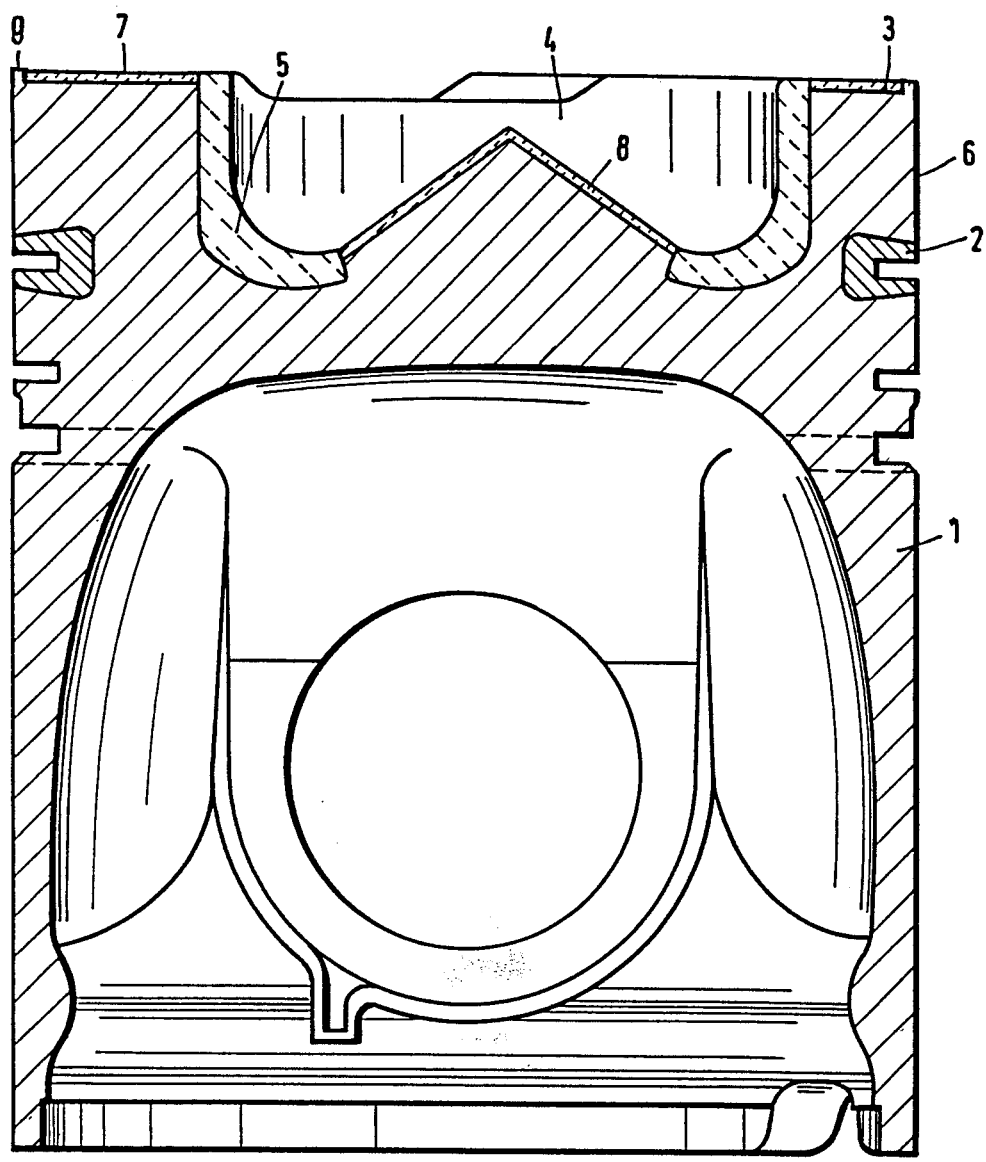

The piston 1 of FIG. 3 shows the side face of the ceramic coating 7 protected by the edge between piston head and top land.

The advantage afforded by the invention resides particularly in that the surface of the piston head which faces the combustion chamber recess is almost entirely heat-insulated.

It will be appreciated that the instant specification and claims are set forth by way of illustration and not limitation, and that various modifications and changes may be made without departing from the spirit and scope of the present invention.

What is claimed is:

1. In a piston for an internal combustion engine, particularly for a supercharged diesel engine, comprising a piston head with a combustion chamber recess and having a heat-insulating layer of ceramic material having a low heat conductivity, the improvement wherein the piston head has a portion surrounding the recess and the recess includes an upwardly extending central conical walled portion and one part of the heat-insulating layer comprises a solid ceramic insert having a wall thickness of 3 mm to 10 mm wherein all of the combustion chamber recess is defined by the ceramic insert and the ceramic insert held in position by shrinkage fit and by form-locking, and another part of the heat insulating layer comprises a ceramic coating separate from said insert and having a thickness of 0.6 to 2 mm which is disposed on a top surface of the piston head surrounding the recess and the ceramic coating extends from the combustion chamber recess at least to an edge of the piston head and is firmly adhered to the piston top surface.

2. The piston according to claim 1, wherein the piston consisting of a light alloy, the eramic insert consists of a ceramic material having a thermal conductivity, below 10 W/mK, a coefficient of linear expansion below $10 \times 10^{-6}$ K, and a modulus of elasticity below $7 \times 10^4$ N/mm$^2$.

3. The piston according to claim 2, wherein the ceramic insert consists of aluminum titanate.

4. The piston according to claim 1, wherein the ceramic coating is disposed in a region of the top surface of the piston head which is spaced around the combustion chamber recess and the ceramic coating extends beyond the edge between the top surface of the piston head and onto a top land almost to an edge between the top land and a first piston ring groove.

5. The piston according to claim 1, wherein the ceramic insert is embedded in a cast piston head.

6. The piston according to claim 1, wherein the piston consists of a ferrous material and the ceramic insert consists of a ceramic material having a low thermal conductivity and having a coefficient of linear expansion which equals that of the ferrous material.

7. The piston according to claim 1, wherein the applied ceramic coating is burnt at temperature of about 500° C.

8. The piston according to claim 1, wherein the ceramic coating is applied by spraying at high temperature.

9. The piston according to claim 1, wherein the ceramic coating consists of one of partly stabilized and entirely stabilized zirconium oxide.

10. The piston according to claim 1, wherein the ceramic coating consists of chromium oxide.

11. The piston according to claim 1, wherein the wall thickness of the ceramic insert is 3 to 6 mm.

12. The piston according to claim 1, wherein the ceramic insert is an interface shrinkage fit in said recess which has a corresponding shape.

13. The piston according to claim 1, wherein the insert with the thickness of 3 mm to 10 mm is disposed on said walls and a conical walled portion of the recess and held in position by shrinkage fit and by form-locking.

* * * * *